United States Patent Office 3,306,921
Patented Feb. 28, 1967

3,306,921
PROCESS FOR PREPARING SODIUM ANTIMONYLGLUCONATE
Arnold Axon, Harold Malcolm Hood, and Sally Burningham Gander, London, England, assignors to Burroughs Wellcome & Co. (U.S.A.) Inc., Tuckahoe, N.Y., a corporation of New York
No Drawing. Filed Mar. 21, 1963, Ser. No. 266,801
Claims priority, application Great Britain, Mar. 29, 1962, 12,145/62, 12,146/62
5 Claims. (Cl. 260—446)

The present invention relates to improvements in or relating to pharmaceutically active drugs, and is particularly concerned with a clinically valuable drug, namely sodium antimonylgluconate.

This is one of the few drugs really effective in clinical practice for the treatment of schistosomiasis, a disease widely endemic in the tropical areas of the world. Thus it has been estimated conservatively that as many as 40 million people suffer from *Schistosoma haematobium* infection, 30 million from *S. mansoni* infection and 46 million from *S. japonicum* infection. As defined in the British Pharmacopoeia, 1958, the drug is a white, amorphous powder containing not less than 30.0 percent and not more than 38.0 percent by weight of total antimony, not less than 95.0 percent by weight of this total being trivalent antimony, and is particularly valuable because in general it is less toxic than the schistosomicidal and chemically related antimony potassium tartrate and antimony sodium tartrate.

However, its full clinical value has yet to be realized in medical practice because of a number of disadvantages, all of which are to a greater or less extent due to the fact that the drug is not a discrete chemical compound having a clearly distinct and identifiable chemical structure and readily determinable physical characteristics but rather is a complex of sodium, antimony and, probably though not certainly, the gluconic acid radical in unknown relationship to each other. In practice this makes it impossible to characterise the drug except by its antimony content, and moreover impossible to be certain that any two separately prepared samples of the drug are the same even though they may have been prepared by exactly the same procedure and under exactly the same conditions. Thus it is necessary to ensure that each and every sample of the drug which is prepared is suitable for clinical use by subjecting it to various chemical, physical and biological tests, of which the most important are probably those for antimony content, stability, therapeutic activity and toxicity. The antimony content and the stability may be determined by, respectively, standard analytical and pharmaceutical techniques, while indications of the therapeutic activity and toxicity may be obtained by measuring, respectively, the activity against *Schistosoma mansoni* in rats and the toxicity in mice.

Of all these tests the most important is that for toxicity and, in fact, a standard test is laid down in the British Pharmacopoeia, 1958. Sixty healthy mice, which have a mouse-to-mouse weight variation of not more than 5.0 g. and have been fed on an adequate diet, are deprived of food for not less than seventeen hours and divided into four equal groups. The mice in each group receive, by intravenous injection, respectively a constant volume of one of two solutions of a Standard Preparation of sodium antimonylgluconate or of one of two solutions of the sample of drug being tested. A suitable constant volume for a mouse weighing 20.0 g. is 0.2 ml., and the solutions are prepared immediately before administration by dissolving the particular preparation in sterilised water. One of the solutions in each pair contains 9.57 mg. per ml. and the other 7.25 mg. per ml. of trivalent antimony, though adjustments may be necessary to allow for variations in the sensitivity of local populations of mice. (Samples of the Standard Preparation for Great Britain and Northern Ireland are kept at, and are obtainable from, the National Institute for Medical Research, Mill Hill, London, England.) After injection the mice are allowed access to food and water. Seventy-two hours later the mortality in each group is recorded, and the respective toxicities calculated by standard statistical methods. The toxicity of the sample being tested should not be more than 110 percent of that of the Standard Preparation, the upper limit of error ($P=0.95$) being not more than 125 percent. Samples with toxicities even only slightly above this level are not suitable for human therapy, and must be rejected.

It will be appreciated that the expense of these tests in terms of materials and time alone is considerable, and that this is particularly so for the stability tests in which it is necessary to keep parts of a sample each under different closely controlled conditions for an extended period and to subject specimens of each part to the other tests at successively longer intervals. Furthermore, the so-called "accelerated stability tests" are not at all satisfactory for sodium antimonylgluconate partly because the tests themselves are by their very nature not entirely accurate and most importantly because the drug seems to be unstable inherently and is to be used mostly in the tropics where the climatic conditions are not at all favourable to stability so that it is essential to determine the stability of any sample as accurately as possible.

As a result of these general considerations, much effort and expense has been directed, since the drug was first described as having therapeutic activity as long ago as 1931 and particularly since 1949 when the drug was first found to have activity against *Schistosoma mansoni* in rats, to establishing a standard preparatory procedure whereby a product of acceptable stability, activity and toxicity as well as of the desired antimony content can be reasonably readily and, most important from the industrial and economic points of view, fairly consistently obtained. Even so, the procedures which have been adopted and are now practiced, on an industrial as well as a laboratory scale, are all based on the first methods disclosed in 1931 in British patent specifications Nos. 343,898 and 352,928. The latter described the technique of reacting sodium hydroxide with a mixture of antimony trichloride and gluconic acid until the reaction mixture is neutral and precipitating the sodium antimonyl-gluconate so formed by adding the reaction mixture to methanol, and stated that the product is neutral; whilst the former described reacting sodium gluconate with freshly precipitated antimony oxyhydrate until the solution remains milky, filtering and treating the filtrate with alcohol to precipitate the formed sodium antimonylgluconate, stated to be slightly acidic. Thus the laboratory and industrial procedures actually adopted may be said in general to be a combination of these two, first disclosed techniques, in practice the preferred reactants being sodium hydroxide, antimony trichloride and gluconic acid or its sodium salt, the preferred precipitating solvent being methanol, and the pH of the reaction mixture being preferably slightly acidic.

The main modifications and developments which have been made to this preferred procedure have all been concerned with closer and more definite control of the pH during the reaction or preparatory stage and the precipitation stage. As a consequence, the pH is maintained between 6.0 and 7.0 and normally about 6.5 during the preparatory stage, and whilst it used to be maintained between these limits during the precipitation stage as well, it is more recently by a preferred practice adjusted to between 5.7 and 5.9 by the addition of acid during this stage.

However, these modifications have not overcome all the difficulties connected with the chemical preparation of sodium antimonylgluconate. Even with the improved pH control, the preferred procedure is most unreliable and samples of the drug obtained at different times thereby are not all the same in their chemical, physical and biological characteristics. Thus, though the desired antimony content and therapeutic activity may be achieved, it is not at all uncommon to find that the samples have widely differing stabilities and toxicities, and that substantial proportions of them have to be rejected because they are too toxic or too unstable or both. During the years 1958 and 1959, for example, seven out of twenty-four samples, that is 28% approximately, had to be rejected on the ground that their toxicities were greater than the laid down maximum of 110 percent when compared with the toxicity of a Standard Preparation. This inconsistency and unreliability are even more serious than simply an economic waste, as during recent years there has been an increasing demand for sodium antimonylgluconate particularly in the areas where schistosomiasis is endemic, and, moreover, because the preparatory difficulties are made more significant and are also to a greater or lesser extent causes of further difficulties when the formulation and presentation of the drug are considered.

In particular the drug and also formulations containing it must be stable and unaffected by the extreme climatic conditions in the endemic areas so that it remains active and also non-toxic during possibly prolonged storage, and consequently it is at present general practice to formulate the drug as a sterile powder for dissolving in sterile, pyrogen-free distilled Water for Injection (known internationally as "Aqua Pro Injectione") immediately before parenteral administration. Three particular types of sterile powder which have been or are used are: (1) the drug is mixed with sufficient monosodium dihydrogen phosphate to ensure that 30.0 percent by weight of total antimony is present, that a suitable daily dose is 225 mg. and that in solution the pH is 5.5; (2) the drug is used on its own and essentially contains 36.0 percent by weight of total antimony, is suitable for a daily dose of 190 mg. and in solution has a pH of 5.4; and (3) the drug is mixed with anhydrous monosodium dihydrogen phosphate (7.7 parts) and anhydrous disodium hydrogen phosphate (2.3 parts) to ensure that 34.6 to 38.0 percent by weight of total antimony is present, that a suitable daily dose is equivalent to 190 mg. of 36.0 percent by weight of total antimony and that in solution the pH is approximately 6.2. In fact, the first two types are no longer used and have been replaced by the third mainly because their toxicity and stability particularly under prolonged storage were not acceptable.

But, especially in the endemic areas, this whole procedure of using a sterile powder, even of the third type, has certain disadvantages as there normally are, for example, only limited refrigeration equipment adequate for storage, only limited sterile facilities suitable for performing the preparation of the injection solution and only limited equipment for accurately measuring the correct amount of Water for Injection. Thus, in these areas it is often very difficult to obtain sterile water of the desired neutral pH let alone the recommended Water for Injection, a larger amount of water than is really necessary may be inadvertently used and causes discomfort to the patient, and it is in practice very difficult if not impossible to be sure that a multi-dose solution only partially used and then stored is still safe to administer. Furthermore, the economic and practical necessity to treat a large number of patients in as short a time as possible is also hindered by the widely variable field conditions at different places and different times. Additionally, the procedure has the disadvantage that the manufacture of the sterile powder includes the expensive techniques of aseptic precipitation, drying and filling in measured amounts into containers.

As a result of these more detailed but nonetheless clearly important considerations, much effort and expense has also been directed to establishing a standard pharmaceutical formulation of acceptable stability as well as of the desired activity, toxicity and antimony content, and in particular a large number of experiments have been performed to investigate the reaction if any of various solutions of sodium antimonylgluconate to autoclaving, probably the most common general technique used in pharmacy for sterilizing powders and solutions. Without any exception whatsoever, it has been found that no solution of the drug is sufficiently stable to withstand autoclaving, even though it contains a stabilizer, such as sodium gluconate or gluconic acid which are both supposed to be good stabilizers for sodium antimonylgluconate, or glucosamine hydrochloride, glucono delta lactone, mannitol, sorbitol, glycerin or propylene glycol. Thus all the solutions became opalescent and deposited a crystalline material, a clear indication of decomposition.

It has now been found that, in complete contrast to the hitherto preferred manufacturing procedure based on the tendency to lower the pH during the precipitation stage by maintaining the pH during the preparatory stage between 6.0 and 7.0 and adjusting it during the precipitation stage to between 5.7 and 5.9, an improved manufacturing process comprises the exact opposite, namely ensuring that the pH of a solution of sodium antimonylgluconate is below 6.3 and then reversing it to between 6.3 and 6.4 before precipitation is effected.

Accordingly, the present invention in one aspect provides an improved process for the manufacture of sodium antimonylgluconate, which comprises ensuring that the pH of a solution of sodium antimonylgluconate is below 6.3, reversing the pH of the solution to between 6.3 and 6.4, and precipitating the sodium antimonylgluconate from this solution by the addition of a solvent which preferentially precipitates it.

The sodium antimonylgluconate so obtained has a lower toxicity, and, as importantly even if not actually more so, the process is more reliable and reproducible and therefore more economic in that different samples of sodium antimonylgluconate so obtained at different times have a consistently lower toxicity.

It is thereby now possible to produce more acceptable sodium antimonylgluconate fairly readily and also to replenish and maintain supplies of acceptable drug more quickly so that the increasing demand for the drug can be more easily met.

Furthermore, it is also possible by the process of the present invention to reclaim samples of sodium antimonylgluconate which have previously been rejected as being too toxic. Hitherto such samples were destroyed. Each sample is preferably initially dissolved in water, the pH of the solution adjusted to between 5.4 and 5.5, and the drug precipitated by the addition of a solvent which preferentially precipitates it; the drug is then subjected to the process of the present invention by redissolving it in water, reversing the pH of the solution to between 6.3 and 6.4, and again precipitating it. The results obtained with eleven samples of initially rejected sodium antimonylgluconate, prepared by the hitherto preferred manufacturing procedure and then treated according to the procedure just described, are given in Table I, the toxicity figure being in comparison with the toxicity of a Standard Preparation, and it is clearly seen that the process of the present invention has a marked effect on the toxicities of the samples.

TABLE I

| Sample No. | Toxicity before treatment, percent | Toxicity after treatment, percent |
|---|---|---|
| 7 | 118 | 103 |
| 9 | 117 | 86 |
| 13 | 118 | 88 |
| 17 | >120 | 100 |
| 24 | 116 | 93 |
| 41 | 168 | 105 |
| 43 | 150 | 107 |
| 46 | 134 | 105 |
| 48 | >120 | 107 |
| 56 | 130 | 97 |

As a particularly preferred feature of this invention the pH of the solution of sodium antimonylgluconate is below 6.0 before it is reversed to between 6.3 and 6.4 and precipitation effected.

The pH is conveniently measured at any time during the process of the present invention by one or more chemical indicators.

Also it has been found that, if the process of this invention is incorporated into a complete process for the manufacture of sodium antimonylgluconate, so that such a process comprises reacting a sodium derivative with a mixture of a derivative of trivalent antimony and gluconic acid or a derivative thereof to form sodium antimonylgluconate, ensuring that the pH of a solution of this material is below 6.3 and preferably below 6.0, reversing the pH of the solution to between 6.3 and 6.4, and precipitating the sodium antimonylgluconate from this solution by the addition of a solvent which preferentially precipitates it, then a particularly preferred feature of the process is to maintain the pH of the reaction mixture comprising a sodium derivative, a trivalent antimony derivative and gluconic acid or a derivative thereof during the preparatory stage below 6.3 and advantageously below 6.0, even though it has also been found in investigating the process that the pH tends to rise and then fall during the preparatory stage. With such a complete process there have been no rejections in thirty-nine samples of sodium antimonylgluconate so obtained on the ground that their toxicities are too high, which in comparison with the results obtained during the years 1958 and 1959 using the hitherto preferred manufacturing procedure is clearly a considerable improvement. There is therefore desirably a complete and definite control of pH during complete processes incorporating the present invention except for those used for the reclaiming of samples of sodium antimonylgluconate which have been prepared by the hitherto preferred manufacturing procedure and have been rejected as being too toxic.

A preferred feature of the complete process is that before the pH of the solution of formed sodium antimonylgluconate is reversed to between 6.3 and 6.4, the crude drug formed by reacting a sodium derivative with a mixture of a derivative of trivalent antimony and gluconic acid or a derivative thereof is precipitated from a solution containing it by the addition of a solvent which preferentially precipitates it. As a practical matter this has the advantage that the by-products of the reaction are to a greater or lesser extent thereby removed at an early point in the process and will not be able to affect the further steps of the process. The remainder of the by-products may then be eliminated during the final precipitation stage.

In greater detail a complete process for the manufacture of sodium antimonylgluconate incorporating the process of the present invention may thus comprise mixing a solution of a trivalent antimony derivative with a solution of gluconic acid or a derivative thereof, and adding a solution of a sodium derivative preferably rapidly in an amount such that the pH of the reaction mixture is not raised above at the very most 6.3 and preferably not above 6.0. The resulting solution may then be heated, cooled and filtered, and a solvent which preferentially precipitates sodium antimonylgluconate rather than any formed by-product added to the filtrate to precipitate the drug in crude form. This may be removed by filtration, and washed and dried, and then a solution of it adjusted to a pH between 6.3 and 6.4 by the gradual and careful addition of an alkali. Sodium antimonyl gluconate may be obtained from this solution by addition of a solvent which again preferentially precipitates the drug rather than any formed by-product, filtration to remove the precipitate so formed, and washing and drying of this precipitate.

The sodium derivative is very advantageously sodium hydroxide though any other convenient sodium material will suffice. Thus it may be a sodium alkoxide.

The especially preferred trivalent antimony derivative is antimony trichloride. However, the derivative may be any material which provides trivalent antimony in an acceptable form during the preparatory stage, and thus antimony oxyhydrate may be used even though it is not as convenient as antimony trichloride.

Similarly, the gluconic acid derivative may be any material which provides the acid radical during the preparatory stage, and may suitably be sodium gluconate, gluconic lactone or a mixture of calcium gluconate and oxalic acid. Preferably the material used is gluconic acid or, in particular, sodium gluconate.

The reversal of the pH of the solution of sodium antimonylgluconate to between 6.3 and 6.4 is preferably effected using sodium hydroxide, though again other alkalis may be used. Thus sodium carbonate, sodium bicarbonate and sodium alkoxides are suitable.

The solvents which may be used during either stage of the process are not of any essential character other than that they are of course solvents for the particular materials used and that the precipitating solvents do in fact precipitate the crude or final sodium antimonylgluconate as appropriate preferentially to the by-products of the process. For example, if antimony trichloride is used as the trivalent antimony derivative, then sodium chloride is a by-product of the process and is desirably not precipitated at all before or with the sodium antimonylgluconate. Thus suitable solvents wil readily occur to those skilled in the art of prepartory chemistry, and particularly convenient examples are, as solvents, water and methanol, and, as a precipitating solvent, methanol. Furthermore, it has been found that, although it is for convenience preferred to perform the entire preparatory stage as well as the precipitation stage in solution, this is not absolutely necessary for the former stage and that a reaction occurs even if a dry mixture of a derivative of trivalent antimony and gluconic acid or a derivative thereof is treated with a solution of a sodium derivative.

The relative amounts of the reactants used in the preparatory stage are not essential to a complete process incorporating the process of the present invention, provided of course that they are not in such amounts that the pH limits during the process and the antimony content limits in the final product are exceeded, and obviously the actual amounts preferably used in any one example of the process will depend to a considerable extent upon the particular chemical plant which is employed. Even so, in general it is preferred to use a molar excess though not a considerable molar excess of the sodium derivative and substantially equimolar amounts of the trivalent antimony derivative and the gluconic acid or derivative thereof, so that different samples of the improved sodium antimonylgluconate prepared at different times have substantially the same antimony content.

The drying of the precipitated sodium antimonylgluconate is desirably achieved by gentle warming. This should be just sufficient to prevent evaporation of any solvent which remains so that the material is not cooled below the dew-point, when condensation of atmospheric moisture will cause stickiness and consequently make the product unsatisfactory. Furthermore, excessive drying not only dries the product too much so that it again tends to be hygroscopic, but also makes it darker in colour.

The present invention extends, of course, to sodium antimonygluconate whenever manufactured by said process substantially as herein described.

The sodium antimonygluconate so manufactured may be presented for administration with an acceptable carrier therefor in pharmaceutical compositions made by any method comprising admixture of the drug and the carrier.

Advantageously, it is presented in unit dose ampoules or multidose containers as a sterile aqueous injection solution containing as carriers a stabilizer, buffer and bacteriostat and optionally an antioxidant and a solute which renders the solution isotonic with the blood. Generally, the solution contains sufficient sodium antimonylgluconate to provide from 2.5 mg. to 3.3 mg. per kg. body weight so that by six doses on successive days the recognised dose level of 15 mg. to 20 mg. per kg. body weight is achieved. Thus conveniently a unit dose ampoule contains a 6.0 percent solution of 190 mg. of drug in 3.0 ml. and a multidose container for six doses contains 18.0 ml. of a 6.0 percent solution.

According to another feature of the present invention, therefore, there is also provided a pharmaceutical composition containing sodium antimonylgluconate whenever manufactured by said improved process, and an acceptable carrier therefor.

Nevertheless, although the improved process of manufacture is a considerable improvement over the manufacturing procedures used hitherto as far as toxicity is concerned, and although the above defined pharmaceutical composition is therefore to an extent acceptable, the process is not a complete answer to all the difficulties encountered hitherto in attempting to produce an acceptable form of sodium antimonylgluconate for pharmaceutical presentation and therapeutic administration, even though, as stated hereinbefore, some of the difficulties are to a greater or lesser extent connected to the manufacturing difficulties which have been made more significant thereby. In particular, and again as stated hereinbefore, no solution of sodium antimonygluconate is sufficiently stable to withstand autoclaving and, as the drug is to be used mainly in the tropics, the general idea of formulating a stable solution was therefore abondoned. However, when sometime after the autoclaving experiments had been performed it was noticed that of the autoclaved and opalescent solutions which had been put aside those containing glycerin or propylene glycol were for no apparent reason somewhat clearer than the others, investigations were started along new lines.

It has now been found that solutions of sodium antimonylgluconate containing a certain definite amount of a stabilizer of the group best exemplified by glycerin and propylene glycol and also between definite pH limits are considerably more stable than solutions containing any of the other equally well known stabilizers named in the above list of examples and moreover any other well known stabilizers. Furthermore it has been found that even if the stable solutions so obtained are stored at about 50° C. the precipitate which forms is non-toxic.

Accordingly, the present invention in another aspect provides a pharmecutical solution of sodium antimonylgluconate in Water for Injection comprising at the most 40 percent by weight of a straight chain, polyhydric aliphatic stabilizer of low molecular weight, said solution being at a pH of from 5.8 to 6.4.

Such solutions are suitable for presentation and administration even after prolonged storage. Furthermore the solutions are especially convenient to manufacture, dispense and receive. Thus it is considerably more economic to produce a sterile solution of the above defined characteristics rather than a sterile powder of the drug; the sterile solutions may be packed ready to be dispensed, so that not only is there no need to prepare a solution from a sterile powder under strictly controlled aseptic conditions but also there is no necessity even to obtain the required sterile water; and as a sterile solution of definite and exact concentration can be readily manufactured an accurate amount of drug in a relatively small volume of solution can be presented and therefore administered to a patient so that the discomfort experienced on receiving an injection of large volume is avoided.

As already stated, the preferred stabilizers are glycerin and propylene glycol. Moreover the stabilizer is advantageously present in an amount up to only 25, and especially 10, percent by weight of the solution.

Within the broad discoveries, it has also been found that the stability of the solution is at a maximum and the toxicity at a minimum when the pH of the solution is between 6.2 and 6.4. Consequently, it is particularly advantageous for the solution to have a pH within this narrower range.

To achieve the desired pH the solution may contain one or more buffering agents such as one or more phosphate or citrate salts. Thus monosodium dihydrogen phosphate or disodium hydrogen phosphate may be used. Conveniently, these two particular phosphate are both present in the solution, the former being preferably in excess of the latter. For example, when both these buffers are present, it is preferred that the amount of monosodium dihydrogen phosphate is between four and a half and five and a half times that of the disodium hydrogen phosphate. Furthermore, it has been found that it is generally satisfactory for there to be from 0.3 to 0.4 percent by weight of the monosodium salt and from 0.07 to 0.08 percent by weight of the disodium salt present.

The pH is conveniently measured by a pH meter.

It is also advantageous for the solution to contain a bacteriostat or bactericide such as p-chloro-m-cresol or benzyl alcohol. Thus it may contain up to 0.3 percent and preferably only up to 0.2 percent by weight of the former, and up to 3.0 percent and preferably only up to 2.0 percent by weight of the latter. The solution may then be conveniently presented in large amounts sufficient for a number of doses.

As the solution will be administered parenterally for the treatment of schistosomiasis, particularly preferred features of the present invention are that the solution is sterilized, of course by a process not including autoclaving, and that the solution so produced is immediately filled into a sterile container which is then sealed. Thereby the acceptability of the Water for Injection and the whole solution is not reduced, and the solution is in fact ready for presentation and administration immediately or after storage.

Preferably the solution is initially produced under nonsterile conditions so that the otherwise necessary aseptic precautions are voided, and may conveniently be produced according to the following procedure. All the substances to be included except for the sodium antimonylgluconate are dissolved in hot Water for Injection, the resulting solution cooled preferably to room temperature and the drug added. The final solution may then be sterilised at ordinary temperatures by, for example, filtration through a sintered glass filter, a Seitz pad or an unglazed porcelain Candle filter.

The container may be of any convient form and, in order to avoid any adverse effect on the stability of the solution, is preferably made of soda-free glass. It may be sealed by fusing its neck if it is, for example, a unit dose ampoule, or by a sterile rubber-cap if it contains a number of doses of the solution.

The invention will now be described, though by way of illustration only, with reference to the following examples.

*Example 1*

A solution of antimony trichloride (8.2 kg.) in methanol (3.6 l.) is added over 10 minutes, though up to an hour or more is satisfactory, to a solution of sodium gluconate (7.4 kg.) in water (18.5 l.), which has previously been treated with charcoal (150 g.). A solution of sodium hydroxide (4.0 kg.) in water (10 l.) is added over approximately 2 to 4 minutes. The resulting solution, which becomes warm, is immediately heated to 90° to 95° C. for approximately 45 minutes cooled and filtered (400 g. of "Celite," a registered trademark for a Hyflo Supercal diatomaceous silica product). The filtrate is added to methanol (200 l.). The precipitate which forms is removed by filtration, washed with methanol (35 to 45 l.) and dried in a hot-cupboard below 65° C.

The dried product is dissolved in water (approximately 10.0 kg. in 9.0 l.) and sodium hydroxide added until the pH is between 6.3 and 6.4 when measured by 5,5'-dibromo - o - cresolsulphonphthalein indicator (commonly known as "Bromocresol Purple"). The solution is added to methanol (250 l.). The precipitate which forms is removed by filtration, washed with methanol (55 to 70 l.) and dried in a current of warm air. The product is sodium antimonylgluconate.

*Example 2*

A solution of sodium gluconate (8.5 kg.) in water (26 l.) is heated in a steam jacketed pan for 20–30 minutes with charcoal (150 g.) and filtered. Methanol (6 l.) is added. A solution of antimony trichloride (8.5 kg.) in methanol (3.8 l.) is then added over 10 minutes, with stirring. Subsequently a solution of sodium hydroxide (3.84 kg.) in water (10 l.) is added over approximately half a minute. The resulting solution, which becomes warm, is immediately heated to 90° to 95° C. for approximately 30 minutes, cooled and filtered (400 g. of "Celite"). The filtrate is added to methanol (200 l.). The precipitate which forms is removed by filtration, washed with methanol (approx. 40 l.) and dried in a hot cupboard below 65° C.

The dried product is dissolved in water, and the pH of the solution adjusted to between 6.3 and 6.4 (using "Bromocresol Purple" indicator) by addition of sodium hydroxide solution. The solution is filtered, and the product reprecipitated from methanol, washed and dried to give sodium antimonylgluconate as in Example 1.

*Example 3*

Sodium gluconate (212 g.) is suspended in a solution of antimony trichloride (205 g.) in methanol (340 ml.). After stirring and warming the mixture for 30 minutes a solution of sodium hydroxide (96 g.) in water (750 ml.) is added over 15 minutes and the mixture refluxed for 30 minutes. The solution is filtered and stirred into methanol (4 l.). The formed precipitate is filtered off, washed and dried.

The product is dissolved in water (240 ml.) and the pH of the solution adjusted to between 6.3 and 6.4 (using "Bromocresol Purple" indicator) by addition of sodium hydroxide solution. The solution is filtered and stirred into methanol (5 l.). The precipitate of sodium antimonyl gluconate is filtered off, washed and dried.

*Example 4*

Solutions having the characteristics given in Table II are produced by the procedure described thereafter.

TABLE II

| Ingredient | (a) | (b) | (c) | (d) |
|---|---|---|---|---|
| Sodium antimonylgluconate (gm.) | 63.83 | 61.6 | 94.5 | 6.3 |
| Percent by weight of total antimony | 35.7 | 37.0 | 36.2 | 36.2 |
| Glycerin (gm.) | 50.0 | 50.0 | 75.0 | 5.0, 10.0, 15.0, 20.0 or 25.0 |
| p-Chloro-m-cresol (gm.) | 2.0 | 2.0 | 3.0 | 0.2 |
| Monosodium dihydrogen phosphate dihydrate (gm.) | 3.33 | 3.33 | 4.99 | 0.333 |
| Anhydrous disodium hydrogen phosphate (gm.) | 0.756 | 0.756 | 1.145 | 0.0756 |
| Water for injection to (ml.) | 1,000 | 1,000 | 1,500 | 100 |
| pH | 5.9 | 6.2 | 6.03 | 6.2 |

Some of the Water for Injection is heated to 80° to 95° C. and the p-chloro-m-cresol, the phosphates and the glycerin dissolved in it. The resulting solution is cooled preferably to room temperature and the sodium antimonyl gluconate added. The rest of the Water for Injection is then added.

Each solution is sterilised by filtration through a Seitz Pad or an unglazed porcelain Gandle filter with full asceptic precautions, and immediately filled into sterile containers. These are single dose, soda-free glass ampoules into each of which are filled 3.0 ml. of the particular solution to provide 190 mg. of sodium antimonylgluconate (36.0 percent by weight of total antimony), or soda-free glass bottles into each of which are filled 18.0 ml. of the particular solution to provide six doses of 190 mg. of sodium antimonylgluconate (36.0 percent by weight of total antimony) in each 3.0 ml. The ampoules are then sealed by fusing their necks by heat, and the bottles by placing a sterile rubber-cap in position.

The solution (a) when filled into glass ampoules or bottles in an atmosphere of nitrogen or carbon dioxide is found to have a pH of respectively 5.95 and 5.9.

*Example 5*

Solutions having the characteristics given in Table IV are also produced by the procedure described in Example 4.

TABLE III

| Ingredient | (f) | (h) | (i) |
|---|---|---|---|
| Sodium antimonylgluconate (gm.) | 6.3 | 63.33 | 1321.7 |
| Percent by weight of total antimony | 36.2 | 36.0 | 36.0 |
| Glycerin (gm.) | 5.0 or 25.0 | 50.0 | 1000.0 |
| p-Chloro-m-cresol (gm.) | — | 1.0 | 20.0 |
| Benzyl alcohol (gm.) | 2.0 | — | — |
| Monosodium dihydrogen phosphate dihydrate (gm.) | 0.333 | 3.33 | 66.6 |
| Anhydrous disodium hydrogen phosphate (gm.) | 0.0756 | 0.756 | 15.12 |
| Water for Injection, to (ml.) | 100 | 1,000 | 20,000 |
| pH | 6.2 | 6.2 | 6.2 |

*Example 6*

Solutions having the characteristics given in Table IV are also produced by the procedure described in Example 4.

TABLE IV

| Ingredient | (e) | (g) |
|---|---|---|
| Sodium antimonylgluconate (gm.) | 6.3 | 6.3 |
| Percent by weight of total antimony | 36.2 | 36.2 |
| Propylene glycol (gm.) | 5.0, 10.0, 15.0, 20.0 or 25.0 | 5.0 or 25.0 |
| p-Chloro-m-cresol (gm.) | 0.2 | |
| Benzyl alcohol (gm.) | | 2.0 |
| Monosodium dihydrogen phosphate dihydrate (gm.) | 0.333 | 0.333 |
| Anhydrous disodium hydrogen phosphate (gm.) | 0.0756 | 0.0756 |
| Water for Injection, to (ml.) | 100 | 100 |
| pH | 6.2 | 6.2 |

We claim:

1. A process for the manufacture of sodium antimonyl gluconate, which comprises reacting at a pH maintained below 6.3 a compound selected from the class consisting of sodium carbonate, sodium bicarbonate, sodium hydroxide and sodium alkoxide in a mixture of a compound selected from the class of antimony trichloride and antimony oxyhydrate and a compound selected from the class consisting of gluconic acid, sodium gluconate and gluconic lactone to form sodium antimonyl gluconate, adding to the reaction a mixture of methanol, which preferentially precipitates the sodium antimonylgluconate, dissolving the precipitated antimonylgluconate to form a solution thereof, adding an alkali material to the solution to reverse the pH of about 6.0 to between 6.3 and 6.4, and adding methanol which preferentially precipitates the sodium antimonylgluconate.

2. A process for the manufacture of sodium antimonylgluconate which comprises reacting at a pH maintained below 6.3 sodium hydroxide with a mixture of a derivative of antimony trichloride in a compound selected from the class consisting of gluconic acid and sodium gluconate to form sodium antimonylgluconate, adding to the reaction mixture methanol which preferentially precipitates sodium antimonylgluconate, dissolving the precipitated sodium antimonylgluconate to form a solution thereof, adding an alkali material to the solution to reverse the pH from about 6.0 to about between 6.3 and 6.4 and adding to the solution a solvent which preferentially precipitates the antimonylgluconate.

3. A process for the manufacture of sodium antimonylgluconate, which comprises reacting at a pH maintained below 6.3 the compound selected from the class consisting of sodium hydroxide and sodium alkoxide with a mixture of a compound selected from the class of antimony trichloride, antimony oxyhydrate and a compound providing the gluconic acid radical, adding to the reaction mixture methanol which preferentially precipitates sodium antimonylgluconate, dissolving the precipitated sodium antimonylgluconate to form an aqueous solution thereof, adding to the aqueous solution an alkali to raise the pH from below 6.3 to between 6.3 and 6.4, and adding to the aqueous solution methanol which preferentially precipitates the sodium antimonylgluconate.

4. A process in accordance with claim 3, wherein the alkali is selected from a class consisting of sodium hydroxide, sodium carbonate, sodium bicarbonate and sodium alkoxide.

5. A process in accordance with claim 3, wherein the alkoxide is methoxide.

References Cited by the Examiner
UNITED STATES PATENTS

| | | | |
|---|---|---|---|
| 2,007,092 | 7/1935 | Kussmaul | 260—446 |
| 2,066,742 | 1/1937 | Schmidt | 260—446 |
| 2,473,735 | 6/1949 | Solomon | 260—446 |
| 3,123,529 | 3/1964 | Kariss et al. | 167—58 |
| 3,159,542 | 12/1964 | Kemmers et al. | 167—65 |

FOREIGN PATENTS

| | | |
|---|---|---|
| 311,748 | 5/1929 | Great Britain. |
| 342,375 | 2/1931 | Great Britain. |
| 343,898 | 2/1931 | Great Britain. |
| 352,928 | 7/1931 | Great Britain. |

OTHER REFERENCES

British Pharmacopoeia, 1958, pp. 292–293, 326–332, 542–543, 589–591, 613–615, 713, 912, pub. London, 1958, by the Pharmaceutical Press.

The Extra Pharmacopoeia, Martindale, 24th ed. 1958, vol. 1, pp. 168–179, 684–688, 1342–1343, pub. London, 1958, by the Pharmaceutical Press.

British Pharmaceutical Codex, 1959, pp. 328, 626, 677–678, 708–709, 818, 944–996, pub. London, 1959, by the Pharmaceutical Press.

Shiao, Sh. et al.: "Experimental Therapy of Schistosomiasis Japonica, XIII. Further Studies on the Enchantment of Schistosomacidal Activity of Antimonials by Glycerin in the Treatment of Experimental Schistosomiasis," Acta. Pharm. Sinica 9: 155–161, March 1962.

TOBIAS E. LEVOW, *Primary Examiner.*

LEWIS GOTTS, *Examiner.*

S. K. ROSE, W. F. W. BELLAMY, *Assistant Examiners.*